US012574989B2

(12) United States Patent
Belling

(10) Patent No.: US 12,574,989 B2
(45) Date of Patent: Mar. 10, 2026

(54) SUPPORTING HIGH NUMBERS OF PUBLIC SAFETY UES IN SMALL AREA

(71) Applicant: Nokia Technologies Oy, Espoo (FI)

(72) Inventor: Horst Thomas Belling, Munich (DE)

(73) Assignee: Nokia Technologies Oy, Espoo (FI)

( * ) Notice: Subject to any disclaimer, the term of this patent is extended or adjusted under 35 U.S.C. 154(b) by 314 days.

(21) Appl. No.: 18/313,621

(22) Filed: May 8, 2023

(65) Prior Publication Data

US 2023/0363038 A1     Nov. 9, 2023

(30) Foreign Application Priority Data

May 6, 2022     (EP) .................................... 22172185

(51) Int. Cl.
*H04W 76/25*     (2018.01)
*H04W 4/10*     (2009.01)
*H04W 76/27*     (2018.01)

(52) U.S. Cl.
CPC ............. *H04W 76/25* (2018.02); *H04W 4/10* (2013.01)

(58) Field of Classification Search
CPC ....... H04W 76/25; H04W 4/10; H04W 76/45; H04W 76/27
See application file for complete search history.

(56) References Cited

U.S. PATENT DOCUMENTS

| | | |
|---|---|---|
| 10,945,163 B2 | 3/2021 | Yang et al. |
| 2002/0102999 A1 | 8/2002 | Maggenti et al. |

| | | | | |
|---|---|---|---|---|
| 2017/0366920 A1* | 12/2017 | Agiwal | ................... | H04W 4/02 |
| 2018/0035265 A1* | 2/2018 | Kim | ...................... | H04W 48/12 |
| 2018/0035267 A1* | 2/2018 | Barrett | ................ | H04L 65/4061 |
| 2019/0394671 A1 | 12/2019 | Harris | | |
| 2020/0228937 A1 | 7/2020 | Yang et al. | | |
| 2020/0305042 A1* | 9/2020 | Alam | .................... | H04L 45/121 |
| 2021/0410045 A1* | 12/2021 | Kadiri | ................... | H04W 48/20 |
| 2024/0023200 A1* | 1/2024 | Xiang | ................... | H04W 76/30 |

FOREIGN PATENT DOCUMENTS

WO     WO 2022/111402 A1 *    2/2022    ............ H04W 76/25

OTHER PUBLICATIONS

"3rd Generation Partnership Project; Technical Specification Group Services and System Aspects; Architectural enhancements for 5G multicast-broadcast services; Stage 2 (Release 17)", 3GPP TS 23.247, V17.2.0, Mar. 2022, pp. 1-108.
"New SID: Architectural enhancements for 5G multicast-broadcast services Phase 2", TSG SA Meeting #SP-94E, SP-211645, Agenda: 9.1.3, Huawei, Dec. 14-20, 2021, pp. 1-5.

(Continued)

*Primary Examiner* — Andrew Wendell
(74) *Attorney, Agent, or Firm* — Nokia Technologies Oy

(57)     ABSTRACT

Method comprising:
determining at least one terminal that should be kept in RRC connected state, wherein the determination is based on at least one of the following criteria: participation of the terminal in a communication session that is to be distributed via multicast or broadcast, a history of communication patterns of the terminal, and input of a human moderator; and
informing a network function of the determined at least one terminal that the terminal should be kept in the RRC connected state.

18 Claims, 5 Drawing Sheets

(56)             References Cited

OTHER PUBLICATIONS

"3rd Generation Partnership Project; Technical Specification Group Services and System Aspects; Common functional architecture to support mission critical services; Stage 2 (Release 18)", 3GPP TS 23.280, V18.1.0, Mar. 2022, pp. 1-299.

"3rd Generation Partnership Project; Technical Specification Group Core Network and Terminals; Mission Critical Push To Talk (MCPTT) call control; Protocol specification (Release 17)", 3GPP TS 24.379, V17.6.0, Mar. 2022, pp. 1-684.

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

U.S. Appl. No. 18/313,176, "Triggering MBS Inactive Reception Mode Announcement", filed May 5, 2023, pp. 1-30.

Partial European Search Report received for corresponding European Patent Application No. 22172185.5, dated Nov. 4, 2022, 19 pages.

"3rd Generation Partnership Project; Technical Specification Group Services and System Aspects; Study on architectural enhancements for 5G multicast-broadcast services; Phase 2 (Release 18)", 3GPP TR 23.700-47, V0.2.0, Apr. 2022, pp. 1-63.

"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

Extended European Search Report received for corresponding European Patent Application No. 22172185.5, dated Jan. 27, 2023, 21 pages.

"Enabling adoption of 5MBS for Public Safety in Rel-18", 3GPP TSG-WG SA2 Meeting #150E e-meeting, S2-2202348, Agenda: 9.18, AT&T, Apr. 6-12, 2022, 2021, pp. 1-2.

"3rd Generation Partnership Project; Technical Specification Group Services and System Aspects; Mission Critical services over 5G System; Stage 2 (Release 18)", 3GPP TS 23.289, V18.1.0, Mar. 2022, pp. 1-103.

* cited by examiner

S110   Determine at least one UE that should be kept in RRC connected state

S120   Inform network function of determined at least one UE to be kept in RRC connected state

110

120

S210   Incoming message from network function received?

yes

S220   Network function authorized to indicate UE to be kept in RRC connected state?

yes

S230   Inform database of UE to be kept in RRC connected state

210

220

230

S310   1st message (UEs to be kept) received?

yes

S320   Store for each UE that it shall be kept in RRC connected state

S330   2nd message (2nd UE) received?

yes

S340   2nd UE belongs to UEs to be kept?

yes

S350   Provide notification to network function that 2nd terminal should be kept in RRC connected state

310

320

330

340

350

S410

Interact with network function to establish packet data unit session with UE

S420

Subscribe to notifications about stored data for UE at a database

S430

Notification (keep UE in connected state) received?

yes

S440

Provide session management information to keep UE in RRC connected state

410

420

430

440

S510

SM request (UEs to be kept) received?

yes

S510

Keep terminal in RRC connected state

S610

UE in RRC inactive state?

yes

S620

UE in a service area of multicast or broadcast session?

yes

S630

Inhibit UE to provide listener report for reception of data related to multicast or broadcast session

510

520

610

620

630

810

820

SUPPORTING HIGH NUMBERS OF PUBLIC SAFETY UES IN SMALL AREA

FIELD OF THE INVENTION

The present disclosure relates to safety UEs using PTT.

Abbreviations

3GPP 3$^{rd}$ Generation Partnership Project
5G/6G/7G 5$^{th}$/6$^{th}$/7$^{th}$ Generation
5GC 5G Core network
AF Application Function
AMF Access and Mobility Management Function
CM Connection Management
gNB next Generation NodeB
ID Identifier
MBS Multicast/Broadcast Services
MBSF Multicast/Broadcast Service Function
MCPTT Mission Critical Push To Talk
NEF Network Exposure Function
NG-RAN Next Generation RAN
PCF Policy Control Function
PDU Protocol Data Unit
PTM Point-to-Multipoint
PTP Point-to-Point
PTT Push To Talk
QoS Quality of Service
RAN Radio Access Network
RRC Radio Resource Control
SM Session Management
SMF Session Management Function
TS Technical Specification
UDM User Data Management
UDR User Data Repository
UE User Equipment
UP User plane

BACKGROUND

In a PTT group call after the call is setup, at a given time only a single group member is allowed to talk and all other affiliated group members listen to this talker. The control action for obtaining this mode of operation is known as floor control. The direct actors of floor control are the floor participants and the floor control server. A floor participant does the floor control related actions in the MCPTT client. The floor control server is the decision maker of the floor control.

At any point in time a group member can request permission to talk. When all group members are silent, a group member can press the PTT button, meaning the request for permission to talk. The floor participant entity of this user reflects this request to the floor control server by sending a Floor Request message. If the floor control server decides to permit, it informs this permission for this request by sending a Floor Granted message to the requesting group member. The floor control server informs the initiation of the talk to the other group members by sending a Floor Taken message. Once the group member receives the permission, a permission indication (permission tone) may be generated by the client to inform the user that they can talk. The media packets (encoded voice) are sent to the controlling MCPTT server and from there they are distributed to all listeners of this group. The release of the PTT button indicates the user's intention to end talking. Once the PTT button is released, the floor participant sends a Floor Release message to the floor control server indicating that this user has finished talking. This cycle, starting from the Floor Granted message and ending with Floor Release message, is known as 'talk burst' or 'media burst'.

A group member can also request permission to talk by sending a Floor Request message during a talk burst. The floor control server can resolve this request in several ways:

1. If this request has higher priority than the ongoing talk burst, the floor control server revokes the current talk burst by sending a Floor Revoke message to the current talker. The current talker is interrupted and the current media burst is ended by the current floor participant by sending a Floor Release message. Then the floor control server sends a Floor Granted message to the revoking user and send Floor Taken message to other group members. Then a new media burst starts.

2. If this request does not have higher priority and floor request queueing is not used the floor control server rejects this request by sending a Floor Deny message to the requester. Then a reject indication (reject tone) is generated for the user. The ongoing talk burst continues.

3. If request queueing is used the floor control server sends Floor Queue Position Info message indicating that there is no permission but the request is queued for potential permission when the current talk burst ends. Then a "queued" indication is generated for the user. The ongoing talk burst continues.

If a UE is in RRC inactive state, the UE AS context is stored at the UE and in gNB. Both UE and the RAN store information about the UE transition from RRC connected to RRC inactive, along with the UE radio protocol configuration. The suspend message that transitions the UE from the RRC connected to the RRC inactive state contains a set of parameters used for inactive state operation, such as a RAN Notification Area (RNA) within which the UE is allowed to move without notifying the network.

3GPP TS 23.700-47 describes the following way to not send group members' UE into RRC inactive state, based on assistance information provided by an AF:

6.3 Solution #3: AF Providing Assistance Information
6.3.1 Introduction
This solution addresses the following bullet in Key Issue #1.
Whether, how and what MBS assistance information to provide from 5GC to RAN for an MBS session allowing UEs in CM-CONNECTED with RRC Inactive state to receive MBS content, including the aspect which 5GC NF(s) determine the MBS assistance information and how they do so.
6.3.2 Functional Description
After the multicast MBS session is created, the AF may provide to the 5GC the group member information (e.g. whether a member belongs to a "privileged" category in a multicast group) so that the group members' UEs are not sent to RRC_INACTIVE state and those members get the best possible service (e.g. voice quality, response time, assurance of not getting pre-empted, etc.).
The 5GC then forward this information to NG-RAN to assist the RAN in the decision which UEs can be sent to RRC_INACTIVE when needed.
The group member information consists of the following:
MBS Session ID,
group member category (e.g. privileged, non-privileged)
6.3.3 Procedures
The following existing procedures specified in TS 23.502 [3] are reused for the AF to provide assistant information, i.e. group member information (e.g. whether a member belongs to a "privileged" category in a multicast group):

4.15.6.6 AF session with required QoS Create procedure 4.15.6.6a AF session with required QoS update procedure 4.16.5.2 PCF initiated SM Policy Association Modification 4.3.3.2 UE or network requested PDU Session Modification (non-roaming and roaming with local breakout)

Compared to clause 4.15.6.6 AF session with required QoS Create procedure of TS 23.502 [3], the additional group member information may be included in the following service operations:

Step 1: Nnef_AFsessionWithQoS_Create request

Step 3: Npcf_PolicyAuthorization_Create request

Compared to clause 4.15.6.6a AF session with required QoS Update procedure of TS 23.502 [3], the additional group member information may be included in the following service operations:

Step 1: Nnef_AFsessionWithQoS_Update request

Step 3: Npcf_PolicyAuthorization_Update request

Compared to clause 4.16.5.2 PCF initiated SM Policy Association Modification, there is following addition:

Step 4 In Npcf_SMPolicyControl_UpdateNotify service operation may include group member information.

Compared to clause 4.3.3.2 UE or network requested PDU Session Modification (non-roaming and roaming with local breakout), there are following additions:

Step 3b PCF initiated SM Policy Association Modification, same as step 4 of clause 4.16.5.2

If the UE has joined the MBS Session and the PDU Session UP activated, the SMF provides the group member information via PDU Session Modification towards the NG-RAN.

If the UE has not joined the MBS Session or the UE has joined the MBS Session but does not have PDU Session UP activated, the SMF stores the group member information. The SMF sends the information to NG-RAN next time when PDU Session UP is activated for UE that has joined the MBS Session.

SUMMARY

It is an object of the present invention to improve the prior art.

According to a first aspect of the invention, there is provided an apparatus comprising:

one or more processors, and memory storing instructions that, when executed by the one or more processors, cause the apparatus to perform:

determining at least one terminal that should be kept in RRC connected state, wherein the determination is based on at least one of the following criteria: participation of the terminal in a communication session that is to be distributed via multicast or broadcast, a history of communication patterns of the terminal, and input of a human moderator; and informing a network function of the determined at least one terminal that the terminal should be kept in the RRC connected state.

According to a second aspect of the invention, there is provided an apparatus comprising:

one or more processors, and memory storing instructions that, when executed by the one or more processors, cause the apparatus to perform:

monitoring whether an incoming message from a network function is received, wherein the incoming message indicates at least one terminal that should be kept in RRC connected state;

determining whether the network function is authorized to indicate the at least one terminal that should be kept in RRC connected state if the incoming message is received; and if the network function is authorized to indicate that the at least one terminal should be kept in RRC connected state, informing a database of the one or several terminals that should be kept in the RRC connected state.

According to a third aspect of the invention, there is provided an apparatus comprising:

one or more processors, and memory storing instructions that, when executed by the one or more processors, cause the apparatus to perform:

monitoring whether a first incoming message is received that indicates at least one terminal that should be kept in RRC connected state;

storing, if the first incoming message is received, for each of the at least one terminals, that it shall be kept in the RRC connected state;

supervising whether a second incoming message is received from a network function, wherein the second incoming message provides a subscription request for notifications about changes of stored information about a second terminal;

checking whether the second terminal is among the at least one terminals if the second incoming message is received; and providing a notification to the network function that the second terminal should be kept in the RRC connected state if the second terminal is among the at least one terminals.

According to a fourth aspect of the invention, there is provided an apparatus comprising:

one or more processors, and memory storing instructions that, when executed by the one or more processors, cause the apparatus to perform:

interacting with a network function to establish a packet data unit session with a terminal;

subscribing to notifications about stored data for the terminal at a database;

monitoring for an incoming notification from the database that provides an indication that the terminal should be kept in RRC connected state;

in response to the incoming notification, providing session management information related to the packet data unit session to the network function that indicates that the terminal should be kept in the RRC connected state.

According to a fifth aspect of the invention, there is provided an apparatus comprising:

one or more processors, and memory storing instructions that, when executed by the one or more processors, cause the apparatus to perform:

monitoring for an incoming session management request related to a packet data unit session with a terminal, wherein the incoming session management request provides an indication that the terminal should be kept in RRC connected state; and in response to the incoming session management request, keeping the terminal in the RRC connected state.

According to a sixth aspect of the invention, there is provided an apparatus comprising:

one or more processors, and memory storing instructions that, when executed by the one or more processors, cause the apparatus to perform:

monitoring whether a terminal is in RRC inactive state;

checking whether the terminal is in a service area of a multicast or broadcast session;

inhibiting the terminal to provide a listener report for the reception of data related to the multicast or broadcast session, if the terminal is in the RRC inactive state and the terminal is in the service area of the multicast or broadcast session.

According to a seventh aspect of the invention, there is provided a method comprising:

determining at least one terminal that should be kept in RRC connected state, wherein the determination is based on at least one of the following criteria: participation of the terminal in a communication session that is to be distributed via multicast or broadcast, a history of communication patterns of the terminal, and input of a human moderator; and informing a network function of the determined at least one terminal that the terminal should be kept in the RRC connected state.

According to an eighth aspect of the invention, there is provided a method comprising:

monitoring whether an incoming message from a network function is received, wherein the incoming message indicates at least one terminal that should be kept in RRC connected state;

determining whether the network function is authorized to indicate the at least one terminal that should be kept in RRC connected state if the incoming message is received; and if the network function is authorized to indicate that the at least one terminal should be kept in RRC connected state, informing a database of the one or several terminals that should be kept in the RRC connected state.

According to a ninth aspect of the invention, there is provided a method comprising:

monitoring whether a first incoming message is received that indicates at least one terminal that should be kept in RRC connected state;

storing, if the first incoming message is received, for each of the at least one terminals, that it shall be kept in the RRC connected state;

supervising whether a second incoming message is received from a network function, wherein the second incoming message provides a subscription request for notifications about changes of stored information about a second terminal;

checking whether the second terminal is among the at least one terminals if the second incoming message is received; and providing a notification to the network function that the second terminal should be kept in the RRC connected state if the second terminal is among the at least one terminals.

According to a tenth aspect of the invention, there is provided a method comprising:

interacting with a network function to establish a packet data unit session with a terminal;

subscribing to notifications about stored data for the terminal at a database;

monitoring for an incoming notification from the database that provides an indication that the terminal should be kept in RRC connected state;

in response to the incoming notification, providing session management information related to the packet data unit session to the network function that indicates that the terminal should be kept in the RRC connected state.

According to an eleventh aspect of the invention, there is provided a method comprising:

monitoring for an incoming session management request related to a packet data unit session with a terminal, wherein the incoming session management request provides an indication that the terminal should be kept in RRC connected state; and in response to the incoming session management request, keeping the terminal in the RRC connected state.

According to a twelfth aspect of the invention, there is provided a method comprising:

monitoring whether a terminal is in RRC inactive state;

checking whether the terminal is in a service area of a multicast or broadcast session;

inhibiting the terminal to provide a listener report for the reception of data related to the multicast or broadcast session, if the terminal is in the RRC inactive state and the terminal is in the service area of the multicast or broadcast session.

Each of the methods of the seventh to twelfth aspects may be a method of RRC state handling.

According to a thirteenth aspect of the invention, there is provided a computer program product comprising a set of instructions which, when executed on an apparatus, is configured to cause the apparatus to carry out the method according to any of the seventh to twelfth aspects. The computer program product may be embodied as a computer-readable medium or directly loadable into a computer.

According to some embodiments of the invention, at least one of the following advantages may be achieved:

total signaling effort may be reduced;

frequent transitions between RRC inactive state and RRC connected state may be avoided;

UE battery consumption may be reduced.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
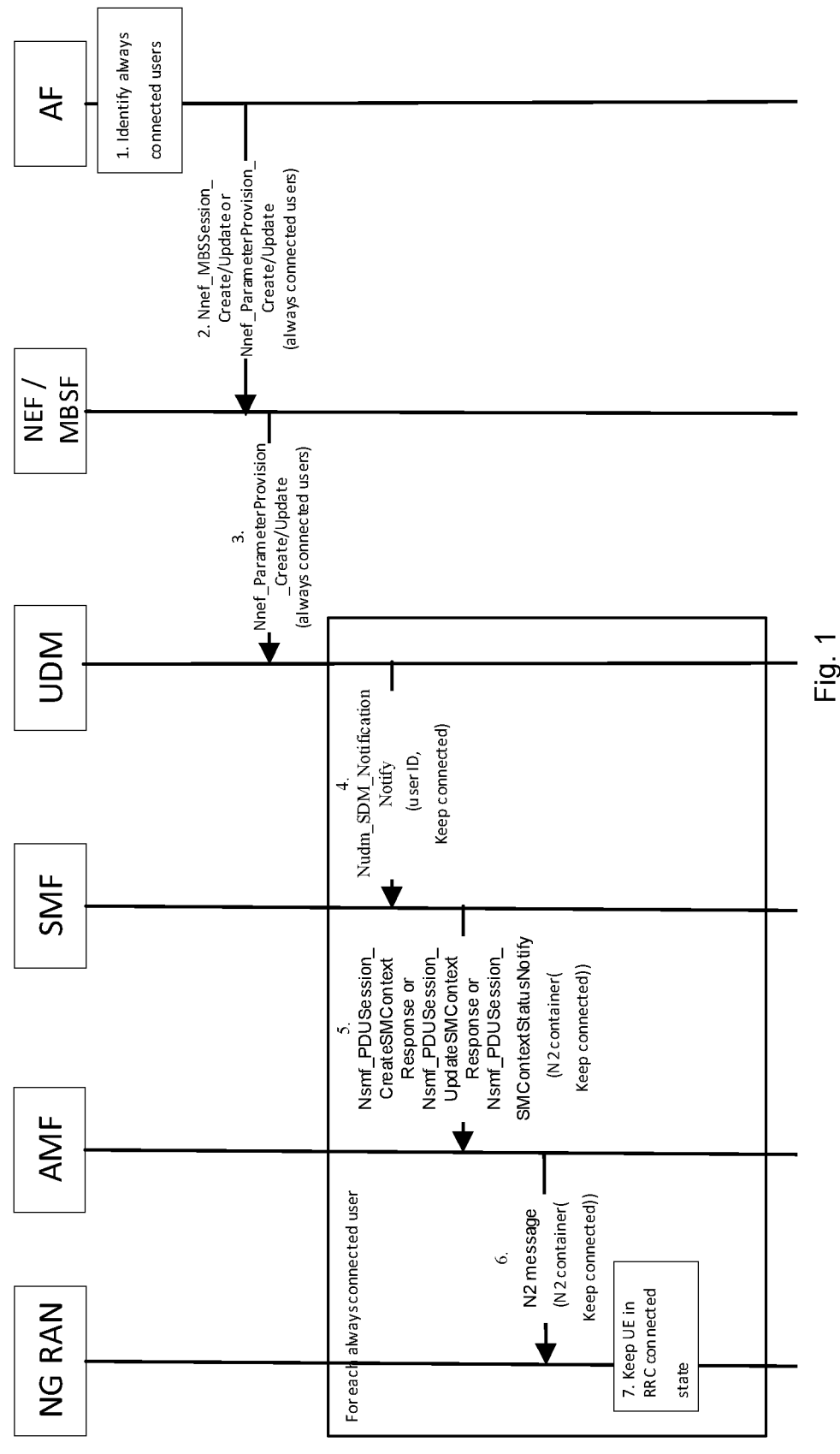
FIG. 1 shows a message sequence chart according to some example embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Public safety UEs should comply with 3GPP TS 23.280 and 3GPP TS 24.379. In particular, they may use MCPTT. Before and in parallel to receiving public safety related MBS data, they may use unicast signaling connections for the following purposes:

To exchange signaling with the public safety system to join public safety groups To exchange signaling with the public safety system related to the establishment of joining of an public safety call (e.g. push-to-talk). For this interaction there are stringent delay requirements.

To exchange signaling with the public safety system to report the location and reception quality ("listener report")

To exchange signaling with the public safety system to request speaker rights. For this interaction there are stringent delay requirements.

To send data to the public safety system that than need to be transmitted to other UEs in a public safety Some performance issues may arise if these interactions are performed by a large number of UEs in parallel to the MBS data transmission. Some example embodiments of the invention solve these performance issues by sending appropriate public safety UEs temporarily to the RRC inactive state to benefit from related enhancements, and to avoid sending other public safety UEs into the RRC inactive state. The selection of the appropriate public safety UEs is based on their history in PTT operations.

Namely, some example embodiments may use the procedures described in 3GPP TS 23.700-47, but instead of the criterion "group member", another criterion based on the PTT history (in particular: its MCPTT history) of the UE may be used to select UEs which are not sent into RRC inactive state.

That is, AF Identifies UEs that should be kept in RRC connected state, e.g. UEs of likely talkers in an MBS session, or UEs that may transition to RRC inactive state, and provides this information to CN. For example, AF may provide this information via Nnef_MBSSession_Create/Update or via Nnef_ParameterProvision_Create/Update service operations (see 3GPP TS 23.502 Clause 4.15.6.2). For example, AF may use a frequency of floor requests received from UE as criterion to select UEs. As another option, it may use the frequency of floor releases received from the UE. The AF may also select UEs based on configured priorities of the UEs, or based on input of a human moderator.

Preferably, AF keeps only a small fraction of the UEs in participating in an MBS session with many participants in connected state. AF preferably removes information that UEs shall always be connected when related MBS session ends. For example, AF may be a floor control server.

Then, in some example embodiments, the procedures of 3GPP TS 23.700 (or a corresponding procedure) may be followed. Namely, AF provides this information to NEF as a parameter, e.g. as a parameter of a session create or update command or as parameter provision. NEF stores in UDM (rather in UDM/UDR, but FIG. 1 shows UDM representing UDM/UDR) this information for users that preferably shall be kept in RRC connected state and not sent to RRC inactive state. For each indicated UE, the UDM stores as part of the UE subscription data that user shall preferably be kept connected.

SMFs are notified about changes in UE subscription data based on previous subscription or may inquire UE subscription data when PDU session is being established. This includes the information that the user shall preferably be kept connected. SMF provides the information that UE shall preferably be kept connected as part of the SM management information via AMF to NG RAN node handling the user.

NG RAN nodes preferably keep a UE for which such information was received in RRC and CM connected state.

Figures 2, 3, 4, 5:
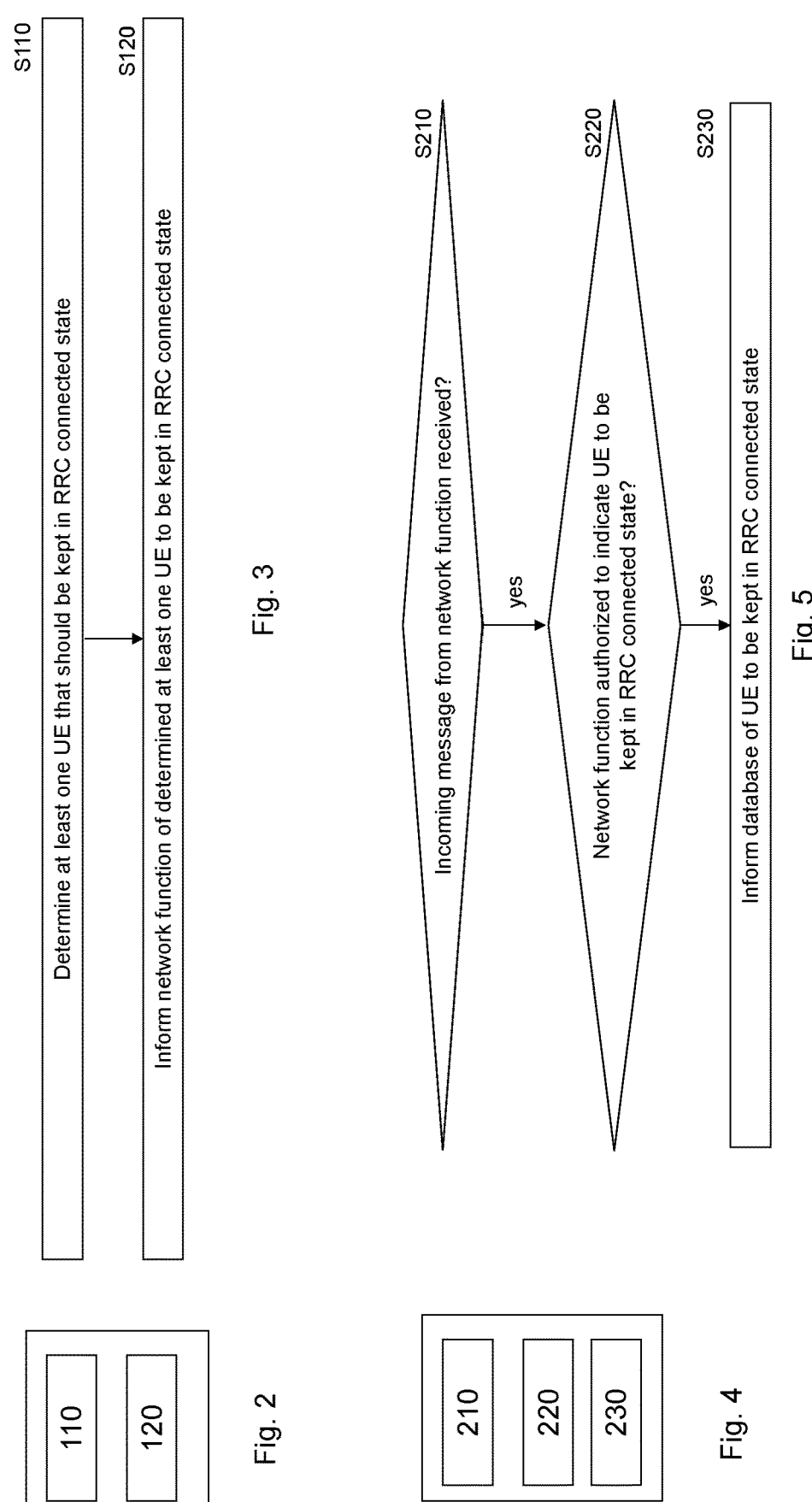
FIG. 2 shows an apparatus according to an example embodiment of the invention.
FIG. 3 shows a method according to an example embodiment of the invention.
FIG. 4 shows an apparatus according to an example embodiment of the invention.
FIG. 5 shows a method according to an example embodiment of the invention.

FIG. 2 shows an apparatus according to an example embodiment of the invention. The apparatus may be an application function (such as a floor control server) or an element thereof.

FIG. 3 shows a method according to an example embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises means for determining 110 and means for informing 120. The means for determining 110 and means for informing 120 may be a determining means and informing means, respectively. The means for determining 110 and means for informing 120 may be a determiner and informer, respectively. The means for determining 110 and means for informing 120 may be a determining processor and informing processor, respectively.

The means for determining 110 determines at least one terminal that should be kept in RRC connected state (S110). The determination is based on at least one of the following criteria: participation of the terminal in a communication session that is to be distributed via multicast or broadcast, a history of communication patterns of the terminal, and input of a human moderator.

The means for informing 120 informs a network function of the determined at least one terminal that the terminal should be kept in the RRC connected state (S120).

FIG. 4 shows an apparatus according to an example embodiment of the invention. The apparatus may be an network exposure function (such as a NEF) or an element thereof. FIG. shows a method according to an example embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises means for monitoring 210, means for determining 220, and means for informing 230. The means for monitoring 210, means for determining 220, and means for informing 230 may be a monitoring means, determining means, and informing means, respectively. The means for monitoring 210, means for determining 220, and means for informing 230 may be a monitor, determiner, and informer, respectively. The means for monitoring 210, means for determining 220, and means for informing 230 may be a monitoring processor, determining processor, and informing processor, respectively.

The means for monitoring 210 monitors whether an incoming message from a network function is received (S210). The incoming message indicates at least one terminal that should be kept in RRC connected state.

If the incoming message is received (S210=yes), the means for determining 220 determines whether the network function is authorized to indicate the at least one terminal that should be kept in RRC connected state (S220).

If the network function is authorized to indicate that the at least one terminal should be kept in RRC connected state (S220=yes), the means for informing 230 informs a database of the one or several terminals that should be kept in the RRC connected state (S230).

Figures 6, 7:
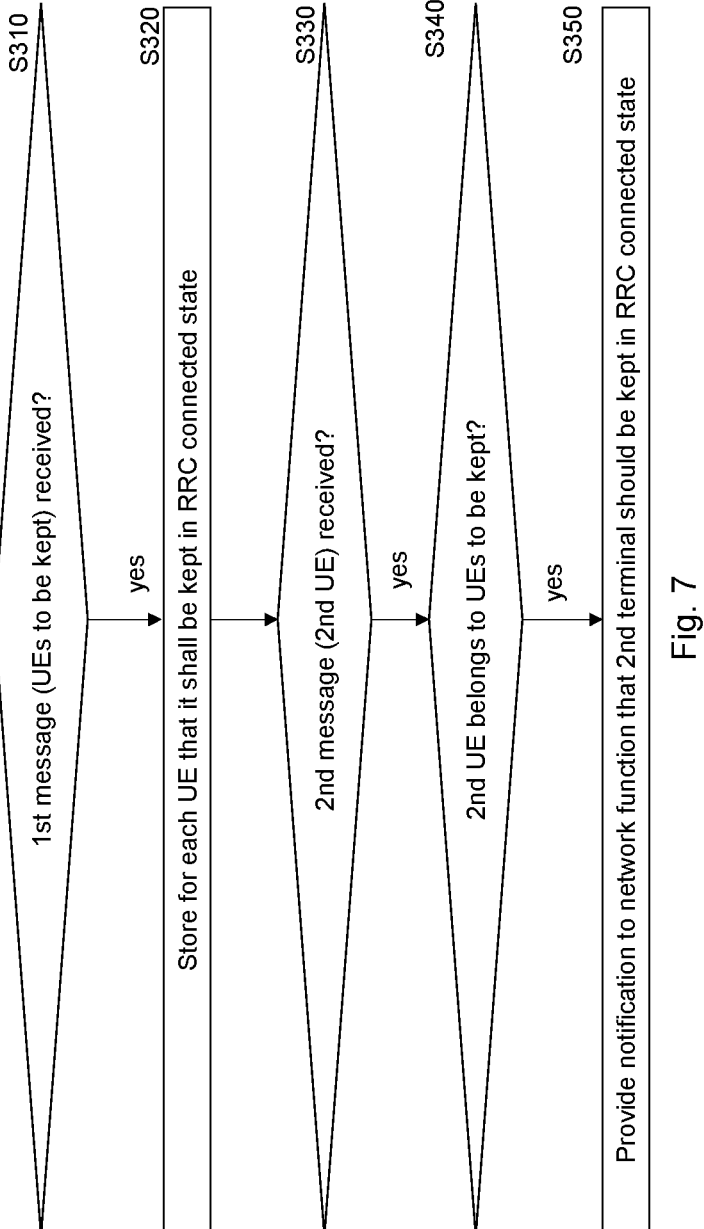
FIG. 6 shows an apparatus according to an example embodiment of the invention.
FIG. 7 shows a method according to an example embodiment of the invention.

FIG. 6 shows an apparatus according to an example embodiment of the invention. The apparatus may be an database (such as a data repository, e.g. a UDM (or UDM/UDR)) or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for monitoring 310, means for storing 320, means for supervising 330, means for checking 340, and means for providing 350. The means for monitoring 310, means for storing 320, means for supervising 330, means for checking 340, and means for providing 350 may be a monitoring means, storing means, supervising means, checking means, and providing means, respectively. The means for monitoring 310, means for storing 320, means for supervising 330, means for checking 340, and means for providing 350 may be a monitor, storage device, supervisor, checker, and provider, respectively. The means for monitoring 310, means for storing 320, means for supervising 330, means for checking 340, and means for providing 350 may be a monitoring processor, storing processor, supervising processor, checking processor, and providing processor, respectively.

The means for monitoring 310 monitors whether a first incoming message is received (S310). The first incoming message indicates at least one terminal that should be kept in RRC connected state. If the first incoming message is received (S310=yes), the means for storing 320 stores, for each of the at least one terminals, that the terminal shall be kept in the RRC connected state (S320).

The means for supervising 330 supervises whether a second incoming message is received from a network function (S330). The second incoming message provides a subscription request for notifications about changes of stored information about a second terminal. If the second incoming message is received (S330=yes), the means for checking 340 checks whether the second terminal is among the at least one terminals of S310 (S340).

If the second terminal is among the at least one terminals (S340=yes), the means for providing 350 provides a notification to the network function that the second terminal should be kept in the RRC connected state (S350). The notification may by a Nudm_SDM_Notification service operation. The network function may be a Session Management Function.

Figures 8, 9:
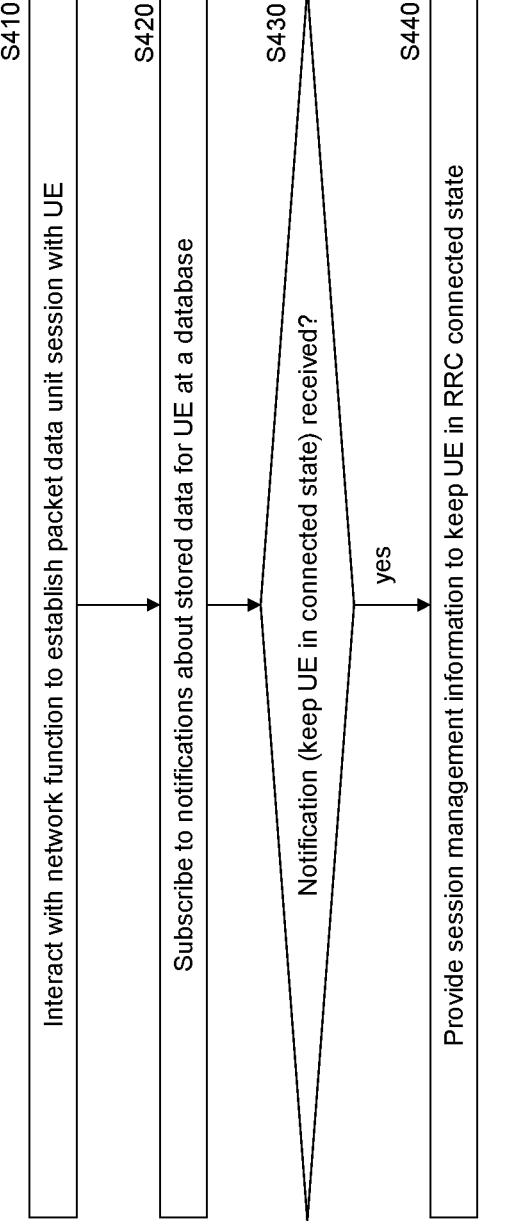
FIG. 8 shows an apparatus according to an example embodiment of the invention.
FIG. 9 shows a method according to an example embodiment of the invention.

FIG. 8 shows an apparatus according to an example embodiment of the invention. The apparatus may be an management function (such as a SMF) or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for interacting 410, means for subscribing 420, means for monitoring 430, and means for providing 440. The means for interacting 410, means for subscribing 420, means for monitoring 430, and means for providing 440 may be a interacting means, subscribing means, monitoring means, and providing means, respectively. The means for interacting 410, means for subscribing 420, means for monitoring 430, and means for providing 440 may be an interactor, subscriber, monitor, and provider, respectively. The means for interacting 410, means for subscribing 420, means for monitoring 430, and means for providing 440 may be a interacting processor, subscribing processor, monitoring processor, and providing processor, respectively.

The means for interacting 410 interacts with a network function to establish a packet data unit session with a terminal (S410). The means for subscribing 420 subscribes to notifications about stored data for the terminal at a database (such as a UDM/UDR) (S420).

The means for monitoring 430 monitors for an incoming notification from the database (S430). The notification provides an indication that the terminal should be kept in RRC connected state.

In response to the incoming notification (S430=yes), the means for providing 440 provides session management information related to the packet data unit session to the network function (S440). The session management information indicates that the terminal should be kept in the RRC connected state.

Figures 10, 11, 12, 13, 14:
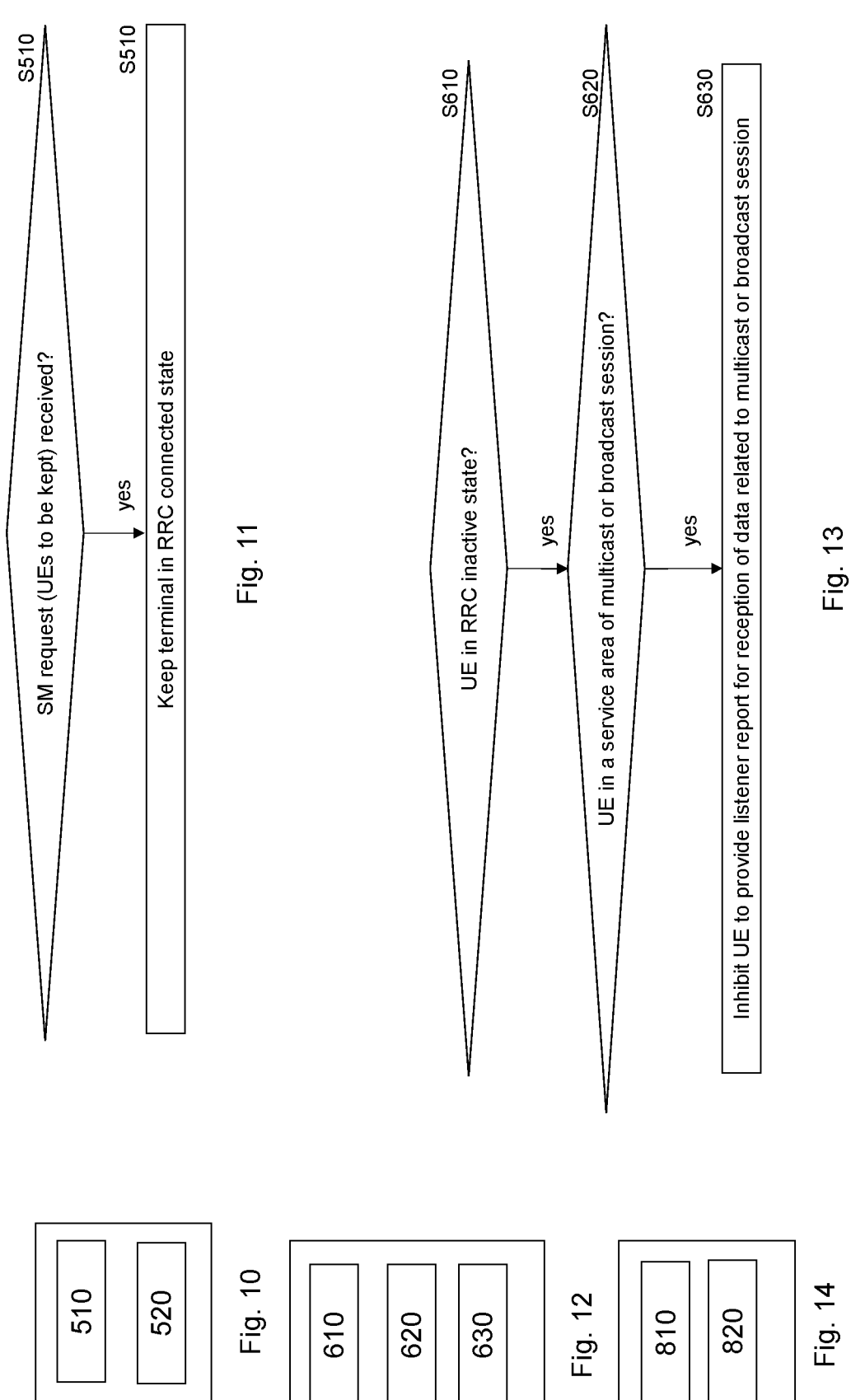
FIG. 10 shows an apparatus according to an example embodiment of the invention.
FIG. 11 shows a method according to an example embodiment of the invention.
FIG. 12 shows an apparatus according to an example embodiment of the invention.
FIG. 13 shows a method according to an example embodiment of the invention.
FIG. 14 shows an apparatus according to an example embodiment of the invention.

FIG. 10 shows an apparatus according to an example embodiment of the invention. The apparatus may be an RAN node (such as a gNB or eNB) or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 510 and means for keeping 520. The means for monitoring 510 and means for keeping 520 may be a monitoring means and keeping means, respectively. The means for monitoring 510 and means for keeping 520 may be a monitor and keeper, respectively. The means for monitoring 510 and means for keeping 520 may be a monitoring processor and keeping processor, respectively.

The means for monitoring 510 monitors for an incoming session management request related to a packet data unit session with a terminal (S510). The incoming session management request provides an indication that the terminal should be kept in RRC connected state.

In response to the incoming session management request (S510=yes), the means for keeping 520 keeps the terminal in the RRC connected state (S520).

Typically, a UE receiving MBMS data may report on the quality of reception by "listener reports". However, if a UE is close to a cell border and moving frequently between cells, these listener reports may become a performance issue. UEs in RRC inactive mode do not know whether or not they are close to a cell border. According to some improvements of MBMS in 5G compared to previous generations, RAN will only transmit in cells where UEs are residing and can also select PTP to PTM transmission depending on number of UEs in cell. Therefore, according to some example embodiments, UEs in an service area of an MBS session and in RRC inactive state do not send listener reports. Thus, service areas may be larger and do not require tight control by AF.

FIG. 12 shows an apparatus according to an example embodiment of the invention. The apparatus may be a terminal (such as a UE, a MTC device etc.) or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for monitoring 210, means for checking 220, and means for inhibiting 230. The means for monitoring 210, means for checking 220, and means for inhibiting 230 may be a monitoring means, checking means, and inhibiting means, respectively. The means for monitoring 210, means for checking 220, and means for inhibiting 230 may be a monitor, checker, and inhibiter, respectively. The means for monitoring 210, means for checking 220, and means for inhibiting 230 may be a monitoring processor, checking processor, and inhibiting processor, respectively.

The means for monitoring 210 monitors whether a terminal is in RRC inactive state (S210). The means for checking 220 checks whether the terminal is in a service area for a multicast or broadcast session (S220). S210 and S220 may be performed in an arbitrary sequence. They may be performed fully or partly in parallel.

If the terminal is in the RRC inactive state (S210=yes) and the terminal is in the service area for the multicast or broadcast session (S220=yes), the means for inhibiting 230 inhibits the terminal to provide a listener report the reception of data related to the multicast or broadcast session (S230).

FIG. 14 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 3, 5, 7, 9, 11, and 13 and related description.

Some example embodiments are explained with respect to a 5G network. However, the invention is not limited to 5G. It may be used in other communication networks using satellites with earth-moving cells, too, e.g. in previous of forthcoming generations of 3GPP networks such as 4G, 6G, or 7G, etc.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a core network function (such as an AF, a NEF, a UDM, a SMF, or an AMF), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a RAN node (such as a base station, e.g. gNB or eNB, etc.) or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The phrase "at least one of A and B" comprises the options only A, only B, and both A and B. The terms "first X" and "second X" include the options that "first X" is the same as "second X" and that "first X" is different from "second X", unless otherwise specified.

The invention claimed is:

1. An apparatus comprising:
   at least one processor, and
   at least one memory storing instructions which, when executed by the one or more processors, cause the apparatus to perform:
      determining a terminal should be kept in RRC connected state, wherein the determining is based on at least one of the following criteria:
         participation of the terminal in a communication session that is to be distributed via multicast or broadcast, or
         a history of communication patterns of the terminal; and
      informing a network function associated with the terminal that the terminal should be kept in the RRC connected state via a Nnef ParameterProvision Create/Update service operation, wherein the network function is a network exposure function.

2. The apparatus according to claim 1, wherein the history of communication patterns of the terminal comprises at least one of the following:

a frequency of floor request messages from the terminal for push-to-talk operations, a frequency of floor release messages from the terminal for push-to-talk operations, a frequency of floor request messages from the terminal for mission critical push-to-talk operations, or a frequency of floor release messages from the terminal for mission critical push-to-talk operations.

3. The apparatus according to claim 2, wherein the instructions, when executed by the one or more processors, further cause the apparatus to perform:

monitoring whether the participation of the terminal in the communication session is terminated when the criteria includes the participation; and informing the network exposure function that the terminal no longer needs to be kept in the RRC connected state in an instance the participation of the terminal in the communication session is terminated.

4. The apparatus according to claim 3, wherein the criteria further comprise a configured priority of the terminal.

5. The apparatus according to claim 2, wherein the criteria further comprise a configured priority of the terminal.

6. The apparatus according to claim 1, wherein the instructions, when executed by the one or more processors, further cause the apparatus to perform:

monitoring whether the participation of the terminal in the communication session is terminated when the criteria includes the participation; and informing the network exposure function that the terminal no longer needs to be kept in the RRC connected state in an instance the participation of the terminal in the communication session is terminated.

7. A method comprising:

determining, by an apparatus, that a terminal should be kept in RRC connected state, wherein the determining is based on at least one of the following criteria:

participation of the terminal in a communication session that is to be distributed via multicast or broadcast, or a history of communication patterns of the terminal; and informing, by the apparatus, a network function associated with the terminal that the terminal should be kept in the RRC connected state via a Nnef ParameterProvision Create/Update service operation, wherein the network function is a network exposure function.

8. The method according to claim 7, wherein the history of communication patterns of the terminal comprises at least one of the following:

a frequency of floor request messages from the terminal for push-to-talk operations, a frequency of floor release messages from the terminal for push-to-talk operations, a frequency of floor request messages from the terminal for mission critical push-to-talk operations, or a frequency of floor release messages from the terminal for mission critical push-to-talk operations.

9. The method according to claim 7 further comprising:

monitoring, by the apparatus, whether the participation of the terminal in the communication session is terminated when the criteria includes the participation; and informing, by the apparatus, the network exposure function that the terminal no longer needs to be kept in the RRC connected state in an instance the participation of the terminal in the communication session is terminated.

10. The method according to claim 7, wherein the criteria further comprise a configured priority of the terminal.

11. The method according to claim 8, wherein the criteria further comprise a configured priority of the terminal.

12. The method according to claim 7, further comprising:

monitoring whether the participation of the terminal in the communication session is terminated when the criteria includes the participation; and informing the network exposure function that the terminal no longer needs to be kept in the RRC connected state in an instance the participation of the terminal in the communication session is terminated.

13. A non-transitory computer readable medium storing instructions, which, when executed by at least one process of an apparatus, cause the apparatus to perform operations, the operations comprising:

determining that a terminal should be kept in RRC connected state, wherein the determining is based on at least one of the following criteria:

participation of the terminal in a communication session that is to be distributed via multicast or broadcast, a history of communication patterns of the terminal, or input of a human moderator; and informing a network function associated with the terminal that the terminal should be kept in the RRC connected state via a Nnef ParameterProvision Create/Update service operation, wherein the network function is a network exposure function.

14. The non-transitory computer readable medium according to claim 13, wherein the history of communication patterns of the terminal comprises at least one of the following:

a frequency of floor request messages from the terminal for push-to-talk operations, a frequency of floor release messages from the terminal for push-to-talk operations, a frequency of floor request messages from the terminal for mission critical push-to-talk operations, or a frequency of floor release messages from the terminal for mission critical push-to-talk operations.

15. The non-transitory computer readable medium according to claim 14, wherein the operations further comprise:

monitoring whether the participation of the terminal in the communication session is terminated when the criteria includes the participation; and informing the network exposure function that the terminal no longer needs to be kept in the RRC connected state in an instance the participation of the terminal in the communication session is terminated.

16. The non-transitory computer readable according to claim 15, wherein the criteria further comprise a configured priority of the terminal.

17. The non-transitory computer readable according to claim 14, wherein the criteria further comprise a configured priority of the terminal.

18. The non-transitory computer readable according to claim 13, wherein the operations further comprise:

monitoring whether the participation of the terminal in the communication session is terminated when the criteria includes the participation; and informing the network exposure function that the terminal no longer needs to be kept in the RRC connected state in an instance the participation of the terminal in the communication session is terminated.

* * * * *